(12) United States Patent
Kumar (10) Patent No.: US 8,974,323 B2
(45) Date of Patent: *Mar. 10, 2015

(54) METHODS AND SYSTEMS FOR BIOMECHANIC CHARACTERIZATION

(71) Applicant: Vasanth I. Kumar, Carlsbad, CA (US)

(72) Inventor: Vasanth I. Kumar, Carlsbad, CA (US)

(73) Assignee: Vasanth I. Kumar, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/915,242

(22) Filed: Jun. 11, 2013

(65) Prior Publication Data

US 2013/0331206 A1    Dec. 12, 2013

Related U.S. Application Data

(63) Continuation-in-part of application No. 13/228,641, filed on Sep. 9, 2011, now Pat. No. 8,460,127.

(60) Provisional application No. 61/381,193, filed on Sep. 9, 2010.

(51) Int. Cl.

| A63B 57/00 | (2006.01) |
|---|---|
| A63B 71/06 | (2006.01) |
| A63B 24/00 | (2006.01) |
| A63B 69/36 | (2006.01) |
| A63F 13/428 | (2014.01) |
| A63F 13/65 | (2014.01) |
| A63F 13/812 | (2014.01) |

(52) U.S. Cl.
CPC ......... *A63B 57/0018* (2013.01); *A63B 71/0622* (2013.01); *A63B 24/0003* (2013.01); *A63B 24/0075* (2013.01); *A63B 2024/0096* (2013.01); *A63B 2071/063* (2013.01); *A63B 2220/24* (2013.01); *A63B 2220/30* (2013.01); *A63B 2220/40* (2013.01); *A63B 2220/833* (2013.01); *A63B 2225/20* (2013.01); *A63B 2225/50* (2013.01); *A63B 2208/14* (2013.01); *A63B 69/3661* (2013.01); *A63B 2071/0694* (2013.01); *A63B 2209/08* (2013.01); *A63B 2209/10* (2013.01); *A63F 13/428* (2013.01); *A63F 13/65* (2013.01); *A63F 13/812* (2013.01)
USPC .......................... 473/396; 473/387; 473/397

(58) Field of Classification Search
CPC .................................................. A63B 57/0018
See application file for complete search history.

(56) References Cited

U.S. PATENT DOCUMENTS

| 2,839,304 | A | * | 6/1958 | Lerick | 473/397 |
| 5,156,403 | A | * | 10/1992 | Martino | 473/278 |
| 5,766,100 | A | * | 6/1998 | Dilmore | 473/396 |
| 6,024,654 | A | * | 2/2000 | Chun | 473/386 |
| 6,062,989 | A | * | 5/2000 | Wagner et al. | 473/386 |

(Continued)

*Primary Examiner* — Nini Legesse
(74) *Attorney, Agent, or Firm* — Mossman, Kumar & Tyler PC (57) ABSTRACT

An apparatus for characterizing a golf swing proximate a mat formed of an engineering material may include a shank having a cup shaped to receive a golf ball at an upper end and a lower end; an articulated joint connected to the lower end of the shank, wherein the articulated joint is configured to allow the shank to bend along at least two axes; a base connected to the articulated joint and having a spike at a lower end; a motion control device operatively engaging the articulated joint, the motion control device maintaining the shank in a nominal position before the golf swing and in a deflected position after the golf swing; and an adapter configured to engage a mat, the adapter having a pliant portion and an opening in the pliant portion for receiving the spike.

19 Claims, 5 Drawing Sheets

(56) References Cited

U.S. PATENT DOCUMENTS

| | | | |
|---|---|---|---|
| 6,328,663 B1 * | 12/2001 | Lipstock | 473/396 |
| 6,482,111 B1 * | 11/2002 | Jofferion | 473/386 |
| 8,460,127 B2 * | 6/2013 | Kumar | 473/396 |
| 2004/0132554 A1 * | 7/2004 | Schulze | 473/386 |
| 2006/0035727 A1 * | 2/2006 | Butterworth | 473/387 |
| 2008/0146383 A1 * | 6/2008 | Dandelius | 473/397 |
| 2012/0214616 A1 * | 8/2012 | Lipstock et al. | 473/396 |

* cited by examiner

METHODS AND SYSTEMS FOR BIOMECHANIC CHARACTERIZATION

CROSS REFERENCE TO RELATED APPLICATIONS

This application is a continuation-in-part of U.S. patent application Ser. No. 13/228,641, filed Sep. 9, 2011, now U.S. Pat. No. 8,460,127, which claims priority from U.S. Provisional Patent Application Ser. No. 61/381,193 filed on Sep. 9, 2010, the disclosures of which are incorporated herein by reference in its entirety.

BACKGROUND OF THE DISCLOSURE

1. Field of the Disclosure

The disclosure relates generally to characterizing and evaluating movements related to sports activities.

2. Description of the Related Art

Sports-related activities require the participant to learn a number of inter-related movements; e.g., a golf stroke. In order for the participant to refine and improve a particular biomechanical movement, the participant may need guidance relating to how a particular movement co-acts with a given object. The present disclosure addresses the need for providing information useful to characterize sports-related movements.

SUMMARY OF THE DISCLOSURE

In aspects, the present disclosure provides an apparatus for characterizing a golf swing proximate a mat formed of an engineering material. The apparatus may include a shank having a cup shaped to receive a golf ball at an upper end and a lower end; an articulated joint connected to the lower end of the shank, wherein the articulated joint is configured to allow the shank to bend along at least two axes; a base connected to the articulated joint and having a spike at a lower end; a motion control device operatively engaging the articulated joint, the motion control device maintaining the shank in a nominal position before the golf swing and in a deflected position after the golf swing; and an adapter configured to engage a mat, the adapter having a pliant portion and an opening in the pliant portion for receiving the spike.

It should be understood that examples of the more important features of the disclosure have been summarized rather broadly in order that detailed description thereof that follows may be better understood, and in order that the contributions to the art may be appreciated. There are, of course, additional features of the disclosure that will be described hereinafter and which will form the subject of the claims appended hereto.

BRIEF DESCRIPTION OF THE DRAWINGS

The advantages and further aspects of the disclosure will be readily appreciated by those of ordinary skill in the art as the same becomes better understood by reference to the following detailed description when considered in conjunction with the accompanying drawings in which like reference characters designate like or similar elements throughout the several figures of the drawing and wherein.

DETAILED DESCRIPTION

The present disclosure relates to devices and methods for biomechanics-related characterizations and evaluations. The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Further, while embodiments may be described as having one or more features or a combination of two or more features, such a feature or a combination of features should not be construed as essential unless expressly stated as essential.

Figure 1:
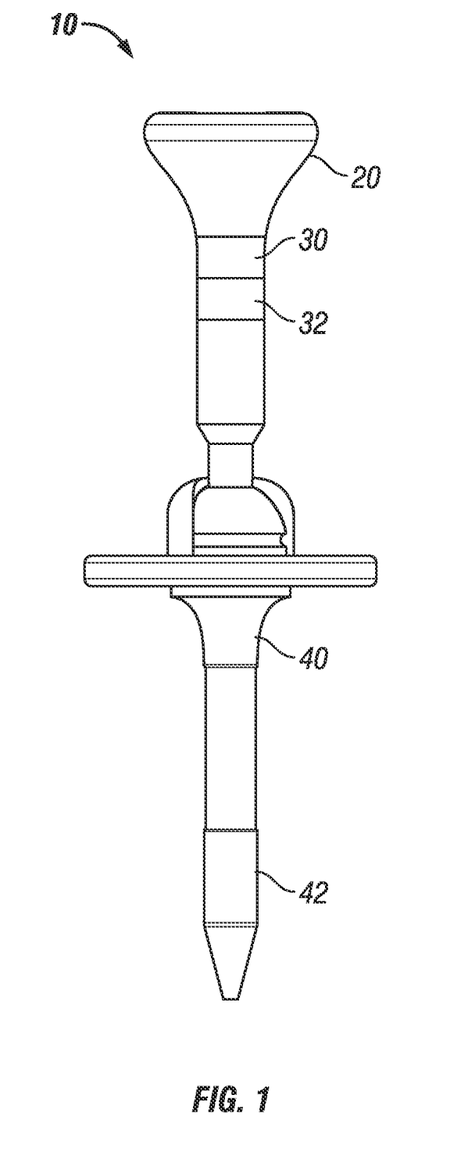
FIG. 1 is the side views a golf tee in accordance with one embodiment of the present disclosure.

Referring initially to FIG. 1, there are shown a golf tee 10 that includes features that provide information as to the co-action between a golf club head and the golf tee 10. By co-action, it is meant the response of the golf tee 10 to kinetic energy transferred from a golf club. In one aspect, the kinetic energy is attributable to the biomechanical movement of a golf player. While golf primarily involves human participants, the present disclosure may also be applicable to characterize the biomechanics of non-human actors, e.g., race horses, guard dogs, dolphins, etc.

In one non-limiting embodiment of the present disclosure, a bio-mechanic responsive golf tee 10 may include a cup 20, a shank 30, and a base 40. The cup 20 may include a damage barrier 22 such as a nitrided surface or a coating (e.g., Teflon or rubber). The shank 30 of the golf tee 10 may be segmented to provide adjustable height. For example, the shank 30 may be made up of a plurality of interlocking segments 32. In some embodiments, one or more portions of the golf tee 10 may be formed of a light weight, high strength material such as titanium. In other embodiments, the shank 30 may be formed of a pliant material such as polyurethane. More generally, materials that have a Young's Modulus similar to polyurethane may be used. That is, the shank or a portion of the shank may be formed of a material having a Young's modulus that is not twenty percent greater than the Young's modulus of polyurethane. In certain embodiments, at least a portion of the shank may be formed of a material having a Young's modulus substantially the same as that of polyurethane (e.g., plus or minus twenty percent). Material having such a Modulus may better absorb the repeated impacts associated with contact from a golf club head. In some embodiments, the entire shank may be formed of such a material. In other embodiments, only a portion or section may be formed of such a material. At the end of the shank 30 is a spherical element 32 that has an articulated engagement with a base 40. That is, the engagement may be a joint that allows one section of the golf tee 10 to become angularly offset from another section of the golf tee 10. The joint may be mechanical (e.g., ball joint), but other engagements such as magnetic connection, chemical cohesion or pliable wire type material may be used. The articulated engagement allows the shank 30 to bend or pivot relative to the base 40 in a manner that provides information as to how the golf tee 10 has co-acted with a golf club head. The information may be the degree or severity of a rotation angle and/or rotation direction relative to a reference frame (e.g., a vertical reference or an azimuthal reference). The articulated joint allows the shank 30 to rotate along at least two axes: the first axis is the long axis though the spike 42 and the second axis is orthogonal to the long axis of the spike 42. The surface of the spherical element 32 may be roughened using a knurled surface to increase the frictional forces with the base 40. Also, alignment features, such as shoulders, ribs, recesses may be used to maintain a desired orientation of the spherical element and to provide a locking mechanism to capture the position of the golf tee 10 after impact before and/or after the user initiates a golf swing. The base 40 may be a platen member having a spike 42 configured to penetrate a surface, such as a golf green or sand. The spike 42 may use a Phillips head-type of shape to enhance engagement with the earth (e.g., provide greater stability).

Figure 2A:
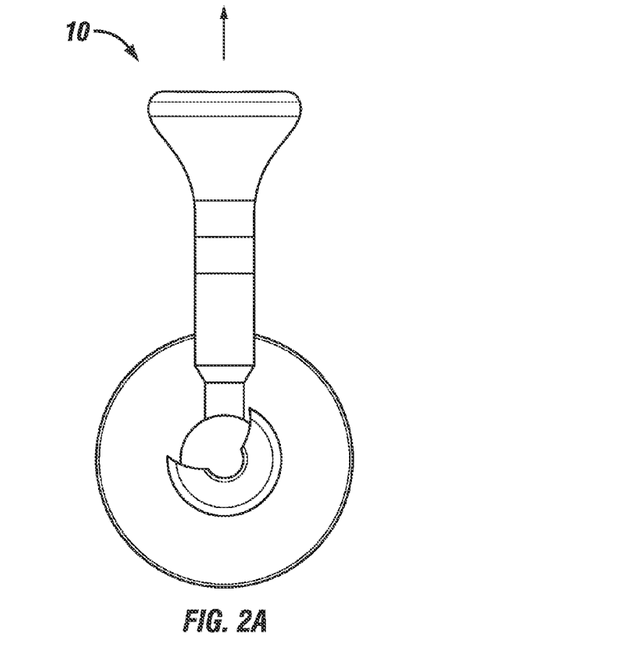
FIGS. 2A-B illustrate the response of a golf tee to different golf swings.
Figure 2B:
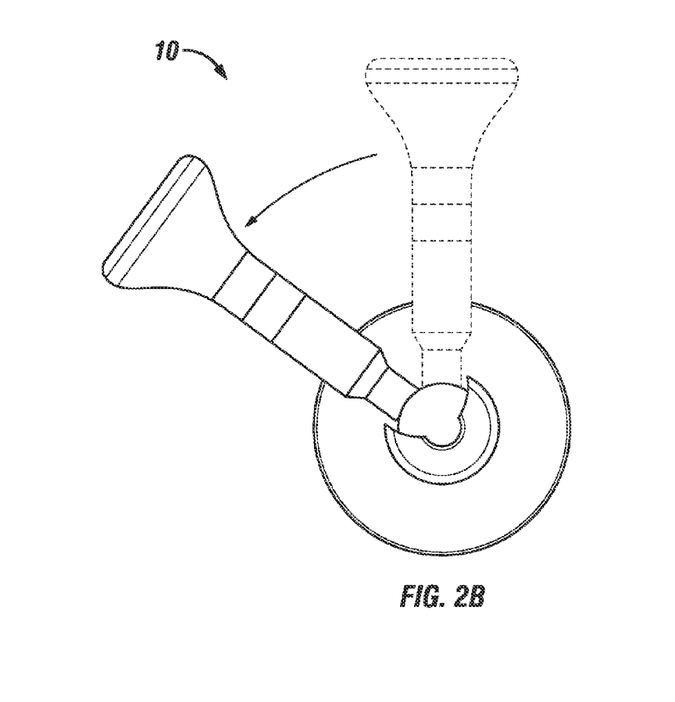

Referring now to FIGS. 2A-B, there are shown illustrative outcomes of co-action between a golf club head (not shown). The bend, pivot, deflection, flexure, twist, or deformation of the golf tee 10 may be used to characterize a motion of a golf club head and/or the position or orientation of a golf club head relative to the golf tee 10. In the shown embodiments, the information relating to the co-action between the golf club head and the golf tee 10 can be obtained at least partially by visual inspection. The information may be the direction of a golf swing. FIG. 2A shows what may be considered an accurate golf swing because the shank dropped to a "twelve o'clock" position. FIG. 2B shows what may be considered an inaccurate golf swing because the shank dropped to a "ten o'clock" position. That is, while the user intended to align a swing with the "twelve o'clock" position, the actual swing produced a misalignment at the golf club head (not shown) that resulted in an errant contact with the golf tee and ball.

Figure 3:
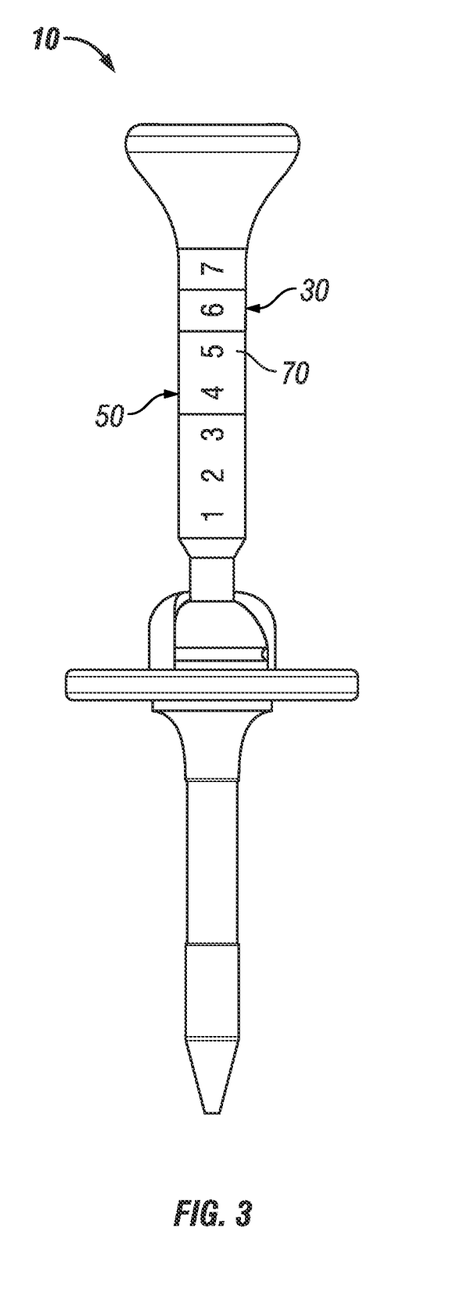
FIG. 3 illustrates a golf tee that uses a flex material in accordance with one embodiment of the present disclosure.

Referring now to FIG. 3, there is shown a golf tee 10 that includes flexible shank 30. The shank 30 may have one or more flex sections that bend, pivot or deform when upon impact with the golf club head. In this embodiment, the bend is within the material or section of the shank 30 rather than at an end of the shank 30 (i.e., at an articulated joint). The flex section retains the deformation, which may be a bend, so that the user may inspect the deformation. Thereafter, the flex section may be reset to an original position. The reset may be by manual manipulation, by applying an electromagnetic signal, or other suitable reset stimulus.

In still other embodiments not shown, the golf tee 10 does not necessarily bend, pivot or deform in a manner that visual inspection provides all of the information relating to a given co-action. Rather, the behavior or response of the golf tee 10 may be sensed by one or more sensors and transmitted to a processor. For example, an accelerometer and digital compass may record the movement of the golf tee 10 without having any portion of the golf tee 10 responsively bend. The information relating to one or more behavior parameters (e.g., velocity, acceleration, deflection, rotation, etc.) generated by the accelerometer and digital compass may be stored in the golf tee 10 and/or transmitted to a separate device. The accelerometer and digital compass are only illustrative direction and motion sensors for characterizing parameters relating to the golf club head (e.g., swing direction, swing velocity, swing accuracy, etc.). In still other embodiments, the movement of the golf tee 10 may be characterized using a reference object, which may be passive or active. For example, an analysis station may be positioned next to the golf tee 10. The analysis station may include a signal emitter (e.g., optical signals, acoustic signals, electromagnetic signals, etc.) that senses the movement of the golf tee 10.

Figure 4:
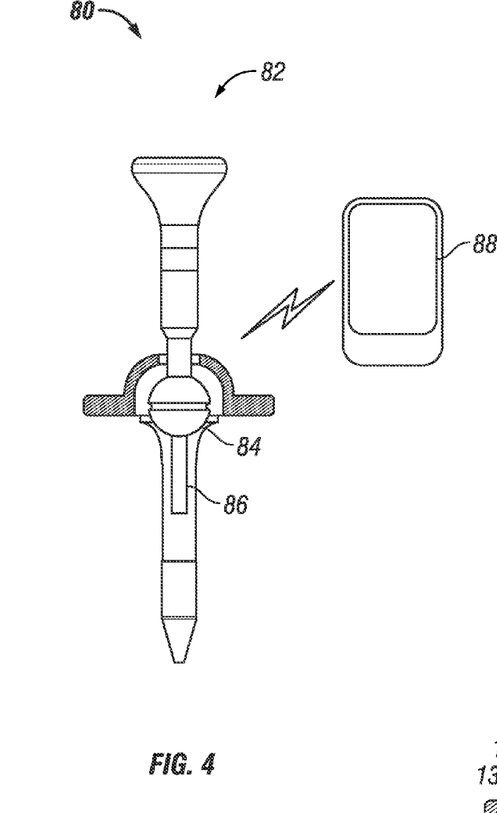
FIG. 4 illustrates a system for characterizing a golf swing that includes an intelligent golf tee and an information processor in accordance with one embodiment of the present disclosure.

Referring now to FIG. 4, there is shown a system 80 for acquiring information relating to a desired movement or motion. In the non-limiting embodiment shown, the system includes an intelligent golf tee 82 that acquires, stores, and transmits information relating to a movement such as a golf club swing. The intelligent golf tee 82 many include a sensor 84 and a signal transmitter 86 that communicates with an information processor 88. The sensor 84 may include an accelerometer, a piezoelectric element, or any other suitable sensor that generates a signal representative of a behavior parameter (e.g., velocity, acceleration, direction, etc.). The signal transmitter 86 may use radio frequency signals or any other suitable signal transmission media. The information processor 88 may be a mobile phone, computer, video game console, laptop, etc, that are programmed with suitable software, algorithms, mathematical models, and other known programming architecture. In some embodiments, the signal transmitter 86 may be omitted, and the user may manually input information into the information processor 88. The information processor 88 may use algorithms, programs, apps, historical data, mathematical models, and other known digital processing and simulations methods to provide the user with one or more diagnostic messages relating to the golf swing. The messages may relate to probable causes of an undesirable ball trajectory or placement, suggested corrective actions the user may take, and/or any other types of information that may be of use to the user.

In one embodiment, a mobile phone or tablet application may be designed and distributed via at least one channel including but not limited to the APPLE APP STORE or the ANDROID MARKET distribution channels. The application may be in communication with the disclosed device in at least one manner including but not limited to user inputted values or data transfer. In one embodiment, the actor may input data dictated by the golf tee 10.

For instance, the actor uses the golf tee 10 for swing analysis and his swing results in the creation of a 45 degree angle between the original position and the final position of the golf tee 10. The actor also notices that his ball slices to the right. The actor would then input the angle value into the app along with the resulting trajectory of the ball (e.g., Hook, slice, straight etc.). The application may then output instructions for the actor to follow in order to achieve a more desirable result. The output may be in a variety of forms including but not limited to digital animated instructions or verbal instructions through the display of the mobile device.

In another embodiment, the application may be in contact with the golf tee 10 in a communicative manner, including BLUETOOTH wireless connection or any medium in which data transmission or signal communication is enabled. Data may include but is not limited to, resulting tee angle or multi-axial acceleration. This may include a wired or wireless connection.

For instance, the actor uses the device for golf swing analysis. The actor may set up a BLUETOOTH wireless data communication connection between a mobile device and the golf tee 10 allowing for wireless data communication. The golf tee 10 is then displaced as a result of the actor's swing. The golf tee 10 may then automatically detects its final angle from the initial position and transmit that to the mobile device. The application may then process the data received from the device and analyze the swing. The application may then output instructions describing how the actor may achieve a more desirable result.

Figure 5:
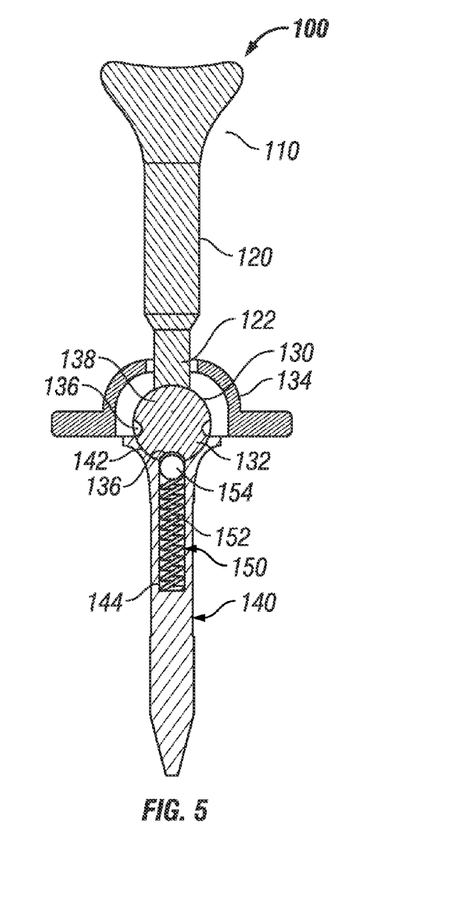
FIG. 5 illustrates a golf tee that uses a motion control device in accordance with one embodiment of the present disclosure.

Referring now to FIG. 5, there is shown another golf tee 100 made in accordance with the present disclosure. The golf tee 100 has a cup 110, a shank 120, an articulated ball joint 130, and a base 140. The cup 110 is shaped to receive a golf ball and may be integral with the shank 120. The ball joint 130 connects the shank 120 to the base 140. The ball joint 130 includes a ball 132 and a cap 134. The ball 132 may feature locking recesses 136 and a bore 138 that connects to an end 122 of the shank 120. The recesses 136 may be formed as recesses or depressions that are strategically located on the ball 132. For example, a first recess 136 may be formed at a "pole" (i.e., bottom end) of the ball 132 and a second recess 136 may be formed at a "equator" (of the ball 136. In some embodiments, the pole recess 136 may be a crater shaped and the equator recess 136 may be formed as a groove. Such a groove may be an arc that extends partially around the ball 132 or may extends fully circumferentially around the ball 132. It should be understood the second recess 136 may be formed at any intermediate location between the equator and the pole and that multiple grooves may be formed on the ball 132. The connection may be threaded or any other suitable connection. The base 140 may include a seat 142 for receiving the ball 132.

Additionally, the golf tee 100 may include a motion control device 150 that controls movement of the ball 132. The motion control device 150 may include a compression element 152, such as a spring, and a detent element 154, which may be a ball. The compression element 152 and the detent element 154 may be disposed in a bore 138 formed in the base 140. In one illustrative arrangement, the cap 134 and the base 140 are secured by interlocking threads. The cap 134 may include a slot 136 that allows the shank 120 a range of motion from zero degrees (vertical) to ninety degrees (horizontal) relative to the longitudinal axis of the base 140 and an arc of up to one-hundred eighty degrees of azimuth. Of course, the slot 136 may be increased or decreased in size to give any desired range of motion. For example, when planted, the golf tee 100 aligns with a vertical datum or reference. The azimuthal reference may be the direction in which the user is facing.

In one non-limiting arrangement, the detent element 154 engages the recess 136 at the pole location to maintain the ball 132 in a nominal position before the golf swing and engages the recess 136 at the equator to maintain the ball 132 in a deflected position after the golf swing. As mentioned previously, it should be appreciated that multiple recesses may be formed between the pole and the equator. Therefore, the detent element 154 may maintain the ball element 132 at a deflected position intermediate between the pole and the equator of the ball 132.

The golf tee 100 may include deflection markings that quantify the degree of deflection with respect to either or both references. For example, the cap 134 may include an array of circumferential markings to estimate azimuthal deflection and the ball 132 may include markings that may be used to estimate a vertical deflection. In some embodiments, the user may manually input information into the information processor 88 shown in FIG. 4 to obtain diagnostic messages.

In another embodiment, a video game may be designed and distributed via at least one channel including but not limited to physical discs or cartridges, downloadable via an online network. The online network may include the WII SHOP CHANNEL, the PLAYSTATION Store or the XBOX 360 Store software distribution channels. Once downloaded and installed, the video game may use the gaming console to set up a connection with the golf tee 10. The connect may be wired or wireless and must only allow for data transmission.

The golf tee 10 may be used in conjunction with other devices compatible with the console including but not limited to a WIIMOTE console, WII BALANCE BOARD console, MICROSOFT KINECT console or THE PLAYSTATION MOVE console.

In one embodiment, the WIIMOTE console may be attached to the actor's golf club and the golf tee 10 set up in a normal manner but without a golf ball to allow for use inside (though a ball may be used if deemed appropriate). The actor may then swing the club in a normal motion, and have the golf tee 10 deflect as if actually hitting a ball. The golf tee 10 may detect its deflection and may transmit the results to the video game via the console through the data connection.

The game may process the information and display corresponding analysis about the actor's swing using data from both the golf tee 10 and the motion sensing device. The results may be instructions in a digital animated format or a verbal format. The game may also allow for a virtual shot to be displayed by analyzing the data acquired from the golf tee 10 and motion sensing device.

In another embodiment, the MICROSOFT KINECT console may be used in conjunction with the golf tee 10 to analyze more aspects of the swing than just the impact. The golf tee 10 may be connected to the XBOX 360 gaming console via a wired or wireless connection that allows for data transmission. The game may acquire information about the movement of the club and body and combine it with data acquired from the golf tee 10 in order to create a more complete set of instructions for achieving a more desirable result. In this embodiment the golf tee 10 would be used in a very similar manner as described before.

In certain embodiments, additional sensors may be installed in the golf ball and/or the golf club head. Thus, a composite information map may be constructed that shows the movement of the golf club, the co-action of the golf club with the golf ball and golf tee 10, and the subsequent response of the golf ball. Moreover, in certain embodiments, using energy conservation principles, the energy efficiency of a golf club swing may be characterized using this information. Such characterizations are merely illustrative of the uses of the information that may be acquired using devices of the present disclosure.

More generally, it should be appreciated that the present disclosure provides one or more implements that are responsive to a given movement. The response may be an indication as to how an actor, which may be a human or non-human (e.g., guard dog), has co-acted with that implement. The implement may be a sports-related object such as a golf tee, a football tee, a base ball glove, a golf ball, etc. In some embodiments, the implement may include one or more sensors such as accelerometers, gyroscopes, magnetometers, directional sensors, velocity sensors, etc. Also, in some embodiments, the implement may include passive or active communication devices (e.g., RFID). The devices may be uni-directional (e.g., a transmitter or a receiver) or bi-directional. In one non-limiting embodiment, the implement may be a golf tee that records the direction and/or magnitude of impact from a head of a golf club.

Referring now to FIGS. 6A-D there are shown embodiments of an adapter that can enable the use of tees according to the present disclosure on artificial surfaces. Facilities such as driving ranges sometimes do not have natural earthen surfaces and grass. Therefore, it is not possible to drive the spike 42 (FIG. 1) into the ground to secure the golf tee 10

Figure 6A:
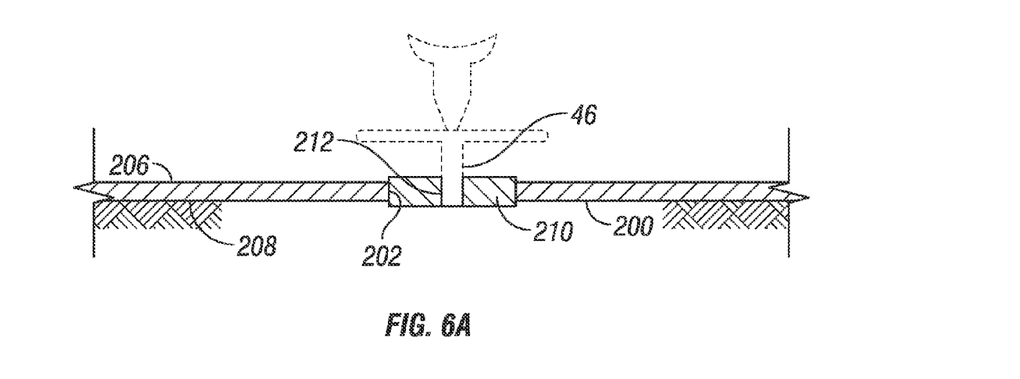
FIGS. 6A-D illustrate exemplary adaptors that may be used with a golf tee in accordance with embodiments of the present disclosure.

(FIG. 1). Often, the surface for using the golf tee is human made or "engineered." As used herein, the term "engineered material" refers to any material has been manufactured as opposed to naturally occurring. As shown in FIGS. 6A-D, a mat 200 is formed of an engineered material. The material making up the mat 200 is sufficiently dense or hard as to prevent penetration by the spike 46 (FIG. 6A). Moreover, fixing the spike 46 to a hard and relatively non-deformable surface may create difficulties during use. For example, if a golf club head were to strike the spike 46, such a surface may not allow the spike 42 to move or disconnect. Thus, undesirable stress concentrations may are in the spike 42 and elsewhere in the golf tee 10 in such an impact situation. This lack of movement may cause to the spike 46 to snap or fracture.

Referring to 6A, there is shown an adapter 210 that mechanically engages the mat 200. The mat 200 may include a pre-existing hole 202 for receiving a conventional tee (now shown). The adapter 210 may be shaped and sized to compressively engage or otherwise fix into the hole 202. In one embodiment, adapter 210 has an opening 212 shaped to receive the spike 46. The opening 212 is oriented such that the spike 46 projects in a normal direction to a surface 206 of the mat 200 that is co-planar with the ground 208. The adapter 210 may be formed of a pliable material such as foam or elastomer. In such embodiments, the modulus of elasticity of the material making up the adapter 210 is lower than the material making up the mat 200. A contrast in the modulus of elasticity is desirable because the adapter 210 will be better suited to release the spike 46 if struck with a golf club head (not shown). That is, the golf tee 10 (FIG. 1) will offer less resistance to the impact and thereby less the risk that damaging stress concentrations will arise.

Figure 6B:
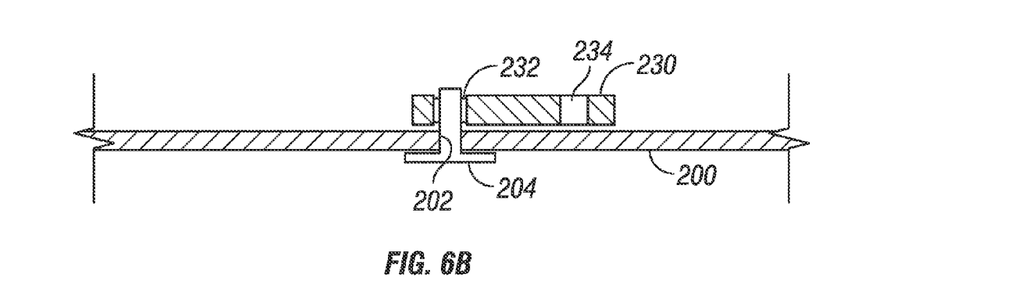

Referring to 6B, there is shown an adapter 230 that mechanically engages the mat 200. By mechanical engagement, it is meant engagement that uses physical contact for transferring forces such as compression and tension as opposed to chemical interactions. The mat 200 may include a pre-existing hole 202 for receiving a conventional tee (now shown). Positioned in the hole 202 is a pre-existing conventional tee 204. The adapter 230 may be shaped and sized to compressively engage or otherwise fix to the golf tee 204. The adapter 210 may have a first passage or slot 232 for receiving the golf tee 204 and an opening 234 shaped to receive the spike (FIG. 6A) as previously described. The adapter 230 may be formed of a pliable material such as foam or elastomer that has a modulus of elasticity low enough to release the spike 46 if struck with a golf club head (not shown).

Figure 6C:
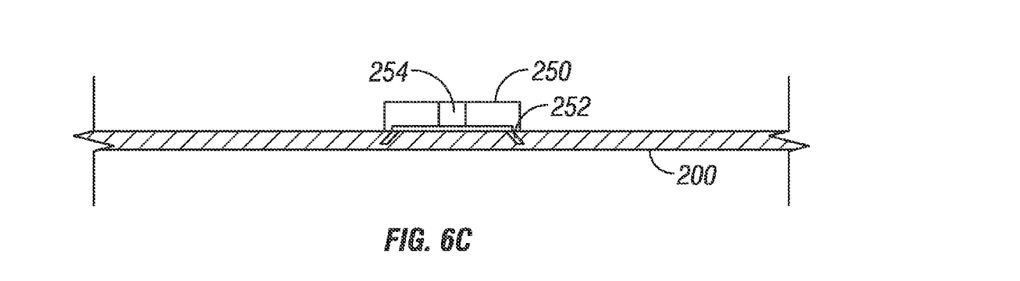

Referring to 6C, there is shown an adapter 250 that mechanically engages the mat 200. The mat 200 does not have a pre-existing hole 202. The adapter 250 has extendable gripping elements 252 that may be shaped and sized to penetrate into the mat 200. The gripping elements 252 are oriented to extend both downward and to the side (i.e., a normal angle and a transverse angle). Also, the gripping elements 252 may be distributed evenly and circumferentially. The adapter 210 may an opening 254 shaped to receive the spike (FIG. 6A) as previously described. The adapter 250 may be formed of a pliable material such as foam or elastomer that has a modulus of elasticity low enough to release the spike 46 if struck with a golf club head (not shown).

Figure 6D:
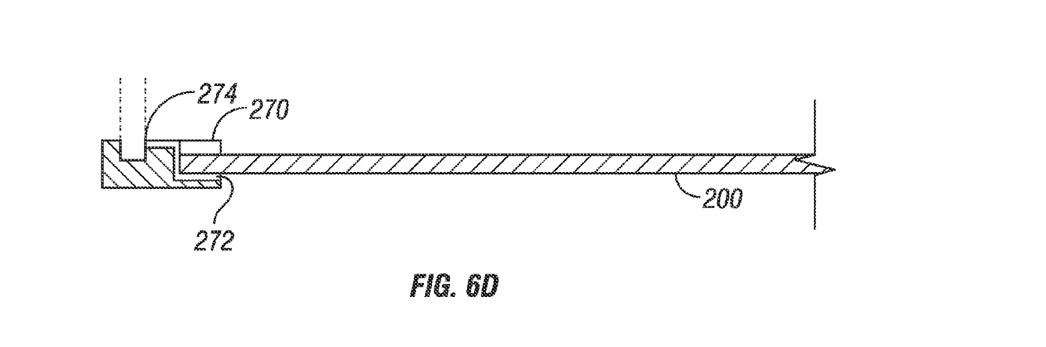

Referring to 6D, there is shown an adapter 270 that that mechanically engages the mat 200. The mat does not include a pre-existing hole. The adapter 210 may have a first passage or slot 272 for receiving an edge of the mat 200 and an opening 274 shaped to receive the spike (FIG. 6A). The adapter 270 may be formed of a pliant material such as foam or elastomer that has a modulus of elasticity low enough to release the spike 46 if struck with a golf club head (not shown).

It should be understood that various connection mechanisms may be used for the adapter. For example, mechanical loops and hook arrangements, mechanical clips, spring-actuated clamps, magnets, and threaded fastening elements some non-limiting examples of connectors that may be used for the adapters. In other embodiments, stick substances may be used to form temporary bonds.

The term "bend" as used in the present disclosure merely refers to a discontinuity a point that results in a misalignment between two or more elements. The misalignment may be along one axis or along multiple axes.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure.

I claim:

1. An apparatus for characterizing a golf swing proximate a mat formed of an engineering material, comprising:
    a shank having a cup shaped to receive a golf ball at an upper end and a lower end;
    an articulated joint connected to the lower end of the shank, wherein the articulated joint is configured to allow the shank to bend along at least two axes;
    a base connected to the articulated joint and having a spike at a lower end;
    a motion control device operatively engaging the articulated joint, the motion control device maintaining the shank in a nominal position before the golf swing and in a deflected position after the golf swing; and
    an adapter configured to engage a mat, the adapter having a pliant portion and an opening in the pliant portion for receiving the spike.

2. The apparatus of claim 1, wherein the opening is oriented such that the spike projects in a direction normal to a surface of the mat that is co-planar with a ground on which the mat rests.

3. The apparatus of claim 1, wherein the adapter has a passage pliant portion has a modulus of elasticity lower than a material making up the mat.

4. The apparatus of claim 1, wherein the adapter mechanically engages the mat.

5. The apparatus of claim 4, wherein the adapter includes at least one gripping element engaging the mat.

6. The apparatus of claim 4, wherein the adapter includes at least one slot receiving an edge of the mat.

7. The apparatus of claim 4, wherein the adapter includes at least one of: (i) a loop and hook arrangement, (ii) a clip, (iii) a spring-actuated clamp, (iv) a magnet, and (v) a threaded fastening element.

8. The apparatus of claim 4, wherein the mat includes a pre-existing hole, and wherein the adapter compressively engages the mat.

9. The apparatus of claim 1, wherein the adapter is formed of a material having a modulus of elasticity that is lower than a material making up the mat.

10. The apparatus of claim 1, wherein the motion control device includes a locking member, the locking member maintaining the shank in the deflected position after the golf swing.

11. The apparatus of claim 1, wherein the articulated joint includes a ball element and the base includes a cavity, and wherein the motion control device includes a spring element that compresses a detent element against the ball element.

12. The apparatus of claim 1, wherein the motion control device includes a spring element and a detent element maintaining the shank in the deflected position after the golf swing.

13. An apparatus for characterizing a golf swing proximate a mat formed of an engineering material, comprising:
- a shank having a cup shaped to receive a golf ball at an upper end and a lower end;
- an articulated joint connected to the lower end of the shank and having a ball element;
- a base connected to the articulated joint and having a spike at a lower end;
- a motion control device operatively engaging the articulated joint, the motion control device including a spring element that compresses a detent element against the ball element, the motion control device maintaining the shank in a nominal position before the golf swing and in a deflected position after the golf swing; and
- an adapter configured to engage a mat, the adapter having a pliant portion and an opening in the pliant portion for receiving the spike.

14. The apparatus of claim 13, wherein the mat includes a pre-existing hole, and wherein the adapter compressively engages the mat.

15. The apparatus of claim 13, wherein the adapter is formed of a material having a modulus of elasticity that is lower than a material making up the mat.

16. The apparatus of claim 13, wherein the adapter mechanically engages the mat.

17. The apparatus of claim 16, wherein the adapter includes at least one gripping element engaging the mat.

18. The apparatus of claim 16, wherein the adapter includes at least one slot receiving an edge of the mat.

19. The apparatus of claim 16, wherein the adapter includes at least one of: (i) a loop and hook arrangement, (ii) a clip, (iii) a spring-actuated clamp, (iv) a magnet, and (v) a threaded fastening element.

* * * * *